(12) United States Patent
Huntsberger et al.

(10) Patent No.: US 8,989,948 B2
(45) Date of Patent: Mar. 24, 2015

(54) SYSTEMS AND METHODS FOR AUTOMATED VESSEL NAVIGATION USING SEA STATE PREDICTION

(75) Inventors: Terrance L. Huntsberger, Altadena, CA (US); Arturo Rankin, Santa Clarita, CA (US); Hrand Aghazarian, La Crescenta, CA (US); Andrew B. Howard, Los Angeles, CA (US); Rene Felix Reinhart, Gutersloh (DE)

(73) Assignee: California Institute of Technology, Pasadena, CA (US)

( * ) Notice: Subject to any disclaimer, the term of this patent is extended or adjusted under 35 U.S.C. 154(b) by 152 days.

(21) Appl. No.: 13/161,425

(22) Filed: Jun. 15, 2011

(65) Prior Publication Data

US 2012/0130569 A1 May 24, 2012

Related U.S. Application Data

(60) Provisional application No. 61/355,064, filed on Jun. 15, 2010, provisional application No. 61/474,839, filed on Apr. 13, 2011.

(51) Int. Cl.
*G01C 21/06* (2006.01)
*G05D 1/00* (2006.01)
(Continued)

(52) U.S. Cl.
CPC ............... *G08G 3/00* (2013.01); *G05D 1/0251* (2013.01); *G01C 21/203* (2013.01); *G05D 1/0206* (2013.01)
USPC .................... 701/28; 701/21; 701/25; 701/26

(58) Field of Classification Search
CPC .. G01C 21/203; G01C 13/002; G01C 13/004; G01C 13/006; B63B 2213/02; B63B 2721/00; B63B 2721/02

USPC ................ 701/21, 23, 24, 25, 26, 28; 440/84
See application file for complete search history.

(56) References Cited

U.S. PATENT DOCUMENTS 6,273,771 B1 * 8/2001 Buckley et al. ................. 440/84
6,308,649 B1 * 10/2001 Gedeon ........................... 701/21
(Continued)

FOREIGN PATENT DOCUMENTS

WO 2011/159832 A2 12/2011

OTHER PUBLICATIONS

Konstanze Reichert, Jens Dannenberg, Henk van den Boom, "X-Band radar derived sea surface elevation maps as input to ship motion forecasting", May 24-27, 2010, Oceans 2010 IEEE—Sydney, ISBN 978-1-4244-5222-4, pp. 1 thru 7.*

(Continued)

*Primary Examiner* — Tuan C. To
*Assistant Examiner* — Dale W Hilgendorf
(74) *Attorney, Agent, or Firm* — KPPB LLP

(57) ABSTRACT

Systems and methods for sea state prediction and autonomous navigation in accordance with embodiments of the invention are disclosed. One embodiment of the invention includes a method of predicting a future sea state including generating a sequence of at least two 3D images of a sea surface using at least two image sensors, detecting peaks and troughs in the 3D images using a processor, identifying at least one wavefront in each 3D image based upon the detected peaks and troughs using the processor, characterizing at least one propagating wave based upon the propagation of wavefronts detected in the sequence of 3D images using the processor, and predicting a future sea state using at least one propagating wave characterizing the propagation of wavefronts in the sequence of 3D images using the processor. Another embodiment includes a method of autonomous vessel navigation based upon a predicted sea state and target location.

22 Claims, 11 Drawing Sheets

(51) Int. Cl.
*G08G 3/00* (2006.01)
*G05D 1/02* (2006.01)
*G01C 21/20* (2006.01)

(56) References Cited

U.S. PATENT DOCUMENTS

| | | | |
|---|---|---|---|
| 6,382,022 B1 | 5/2002 | Martinez et al. | |
| 6,611,737 B1* | 8/2003 | El-Tahan et al. | 701/21 |
| 7,630,077 B2 | 12/2009 | Schultz et al. | |
| 2003/0189513 A1* | 10/2003 | Harigae et al. | 342/357.06 |
| 2007/0282560 A1 | 12/2007 | Anderson | |
| 2008/0255757 A1* | 10/2008 | Bruce et al. | 701/202 |
| 2009/0043436 A1* | 2/2009 | Igarashi et al. | 701/21 |
| 2009/0271054 A1 | 10/2009 | Dokken | |
| 2010/0315284 A1* | 12/2010 | Trizna | 342/123 |

OTHER PUBLICATIONS

Grob et al., "Vision-Based Wave Sensing for High Speed Vessels", IEEE Explore, 2004, 4 pgs.

Krishnamurthy et al., "A Modeling Framework for Six Degree-of-Freedom Control of Unmanned Sea Surface Vehicles", Proceedings of the 44th IEEE Conference of Decision and Control, and the European Control Conference, Dec. 12-15, 2005, pp. 2676-2681.

Krishnamurthy et al., "Control Design for Unmanned Sea Surface Vehicles: Hardware-In-The-Loop Simulator and Experimental Results", Proceedings of the 2007 IEEE/RSJ International Conference on Intelligent Robots and Systems, Oct. 29-Nov. 2, 2007, pp. 3660-3665.

Maritime and Coastguard Agency, "Research Project 502: High-Speed Craft dynamic Stability in Following & Quartering Seas—Operational Guidance", Marine Guidance Note MGN 328 (M), Aug. 2006, pp. 1-7.

Wanek et al., "Automated trinocular stereo imaging system for three-dimensional surface wave measurements", Ocean Engineering, 2006, vol. 33, pp. 723-747.

International Search Report and Written Opinion for International Application No. PCT/US2011/040576, Report completed Jan. 20, 2012, 7 pgs.

\* cited by examiner

SYSTEMS AND METHODS FOR AUTOMATED VESSEL NAVIGATION USING SEA STATE PREDICTION

RELATED APPLICATIONS

This application claims priority to U.S. Provisional. Application 61/355,064 filed Jun. 15, 2010 and U.S. Provisional. Application 61/474,839 filed Apr. 13, 2011, the disclosures of which are incorporated herein by reference.

STATEMENT OF FEDERAL SUPPORT

The invention described herein was made in the performance of work under a NASA contract, and is subject to the provisions of Public Law 96-517 (35 U.S.C. §202) in which the Contractor has elected to retain title.

FIELD OF THE INVENTION

The present invention is generally related to sea state prediction and automated vessel navigation, and more specifically to sea state prediction by detecting wave fronts and automated vessel navigation based upon main wave direction.

BACKGROUND

Vessel navigation on fluid surfaces such as the sea can be more difficult than vehicle navigation on rigid surfaces such as on land. Waves on fluid surfaces apply significant force to vessels, in particular when such vessels are moving with high speeds in severe sea conditions. Severe sea conditions are sea conditions with significant wave activity. Severe sea conditions can be acutely fell in littoral operations, or operations close to shore, where the shallow water and underwater geography can create significant wave lengths and speeds. Vessels that can command high speeds or that are of a small mass are especially vulnerable to damage from severe sea conditions. This damage caused by kinetic wave energy includes crew injuries, capsizing, bow diving or other damage to the vessel. Furthermore, waves can slow a vessel down from reaching its target destination. Severe sea conditions are not limited to conditions at sea but can apply to conditions on any body of water including fresh or salt water as well as an ocean, lake or river.

The difficulty of navigating a vessel in severe sea conditions is further compounded for autonomous vessel navigation. Difficulty can arise where vessel navigation depends upon the limited resources of machine sensory equipment and processing to navigate the vessel.

SUMMARY OF THE INVENTION

Systems and methods in accordance with embodiments of the invention perform sea state prediction and/or autonomous navigation. One embodiment of the invention includes a method of predicting a future sea state including generating a sequence of at least two 3D images of a sea surface using at least two image sensors, detecting peaks and troughs in the 3D images using a processor, identifying at least one wavefront in each 3D image based upon the detected peaks and troughs using the processor, characterizing at least one propagating wave based upon the propagation of wavefronts detected in the sequence of 3D images using the processor, and predicting a future sea state using the at least one propagating wave characterizing the propagation of wavefronts in the sequence of 3D images using the processor.

In a further embodiment, generating a sequence of at least two 3D images of a sea surface uses two pairs of image sensors.

In another embodiment, generating a sequence of at least two 3D images of a sea surface also includes using a radar sensor in combination with the at least two image sensors.

In a still further embodiment, images sensors capture black and white images.

In a still another embodiment, image sensors capture color images.

In a yet further embodiment, detecting peaks and troughs includes using a random sampling process.

In a yet another embodiment, detecting peaks and troughs includes using a least means squares process.

In a further embodiment again, detecting peaks and troughs includes using a thresholding process.

In another embodiment again, identifying at least one wavefront includes using a nearest neighbor process.

In a further additional embodiment, characterizing at least one propagating wave includes determining the amplitude, frequency and velocity of at least one propagating wave.

In another additional embodiment, characterizing at least one propagating wave includes determining the direction of at least one propagating wave.

In a still yet further embodiment, characterizing at least one propagating wave includes determining the wave phase of at least one propagating wave.

A still yet another embodiment further includes autonomously navigating a vessel based upon a predicted future sea state.

A still yet another embodiment includes a method of autonomous vessel navigation based upon a predicted sea state and target location, including determining at least one subtarget based upon target location and predicted sea state using a macronavigation system, communicating at least one subtarget to the micronavigation system, and controlling a vessel to navigate toward at least one subtarget using a micronavigation system.

In a still further embodiment again, a predicted sea state includes a main wave direction.

In still another embodiment again, a predicted sea state includes a wave phase information.

In a still further additional embodiment, a subtarget is the target location.

In still another additional embodiment, a micronavigation system includes a proportional integral derivative controller.

In a yet further embodiment again, navigating toward at least one subtarget causes the vessel to tack relative to a main wave direction.

In a yet another embodiment again, a subtarget causes the vessel to navigate at 60 degrees relative to the main wave direction.

In a yet further additional embodiment, controlling the vessel includes controlling the throttle and the rudder of the vessel.

In a yet another additional embodiment, a predicted sea state is predicted using at least one propagating wave characterizing propagation of wavefronts from detected peaks and troughs in a sequence of 3D images.

A further additional embodiment again includes a system for predicting a future sea state including a sensor system configured to capture information concerning the shape of the sea surface, a sea state processor configured to communicate with a sensor system, wherein the sensor system and the sea state processor are configured so that captured information is used to generate a sequence of 3D images of a sea surface, wherein the sea state processor is configured to detect peaks and troughs in the 3D images, identify at least one wavefront in each 3D image based upon the detected peaks and troughs, characterize at least one propagating wave based upon the propagation of wavefronts detected in the sequence of 3D images using the processor, and predict a future sea state using at least one propagating wave characterizing the propagation of wavefronts in the sequence of 3D images using the processor.

In another additional embodiment again, a sensor system includes two pairs of image sensors.

In another further embodiment again, a sensor system includes a radar sensor.

In another further embodiment, a sensor system and a sea state processor are configured so that captured information is used to generate a sequence of black and white 3D images of a sea surface.

In still another further embodiment, a sensor system and a sea state processor are configured so that captured information is used to generate a sequence of color 3D images of a sea surface.

In yet another further embodiment, a sea state processor is configured to detect peaks and troughs using a random sampling process.

In another further embodiment again, a sea state processor is configured to detect peaks and troughs using a least means squares process.

In another further additional embodiment, a sea state processor is configured to detect peaks and troughs using a thresholding process.

In still yet another further embodiment, a sea state processor is configured to identify at least one wavefront using a nearest neighbor process.

In another yet additional embodiment, a sea state processor is configured to characterize at least one propagating wave by the amplitude, frequency and velocity of the at least one propagating wave.

In another yet further embodiment, a sea state processor is configured to characterize at least one propagating wave by the direction of the at least one propagating wave.

In another yet additional embodiment again, a sea state processor is configured to characterize at least one propagating wave by the wave phase of the at least one propagating wave.

Another yet further embodiment again includes an autonomous vessel navigation system that utilizes the predicted future sea state to determine vessel heading when navigating toward a target.

A further embodiment includes an autonomous vessel navigation system, including a macronavigation system configured to receive a predicted sea state and a target as inputs and to generate a subtarget as an output, and a micronavigation system configured to receive a subtarget as an input and to generate vessel control signals as outputs, wherein the macronavigation system is configured to determine at least one subtarget based upon the target location and the predicted sea state, and communicate at least one subtarget to the micronavigation system, and wherein the micronavigation system is configured to generate vessel control signals that head a vessel toward at least one subtarget.

In a yet further additional embodiment, a predicted sea state includes a main wave direction.

In a further additional again embodiment, a predicted sea state includes wave phase information.

In another further embodiment again, a subtarget is a target location.

In yet another further embodiment again, a micronavigation system includes a proportional integral derivative controller.

In a further embodiment, a macronavigation system is configured to cause a vessel to tack relative to a main wave direction.

In yet a further embodiment, a macronavigation system is configured to determine at least one subtarget that causes vessel navigation at 60 degrees relative to a main wave direction In a yet further embodiment again, a micronavigation system is configured to generate vessel control signals configured to control the throttle and the rudder of a vessel.

In another further embodiment yet again, a macronavigation system is configured to receive a predicted sea state from a system for predicting a future sea state.

DETAILED DESCRIPTION

Figure 1:
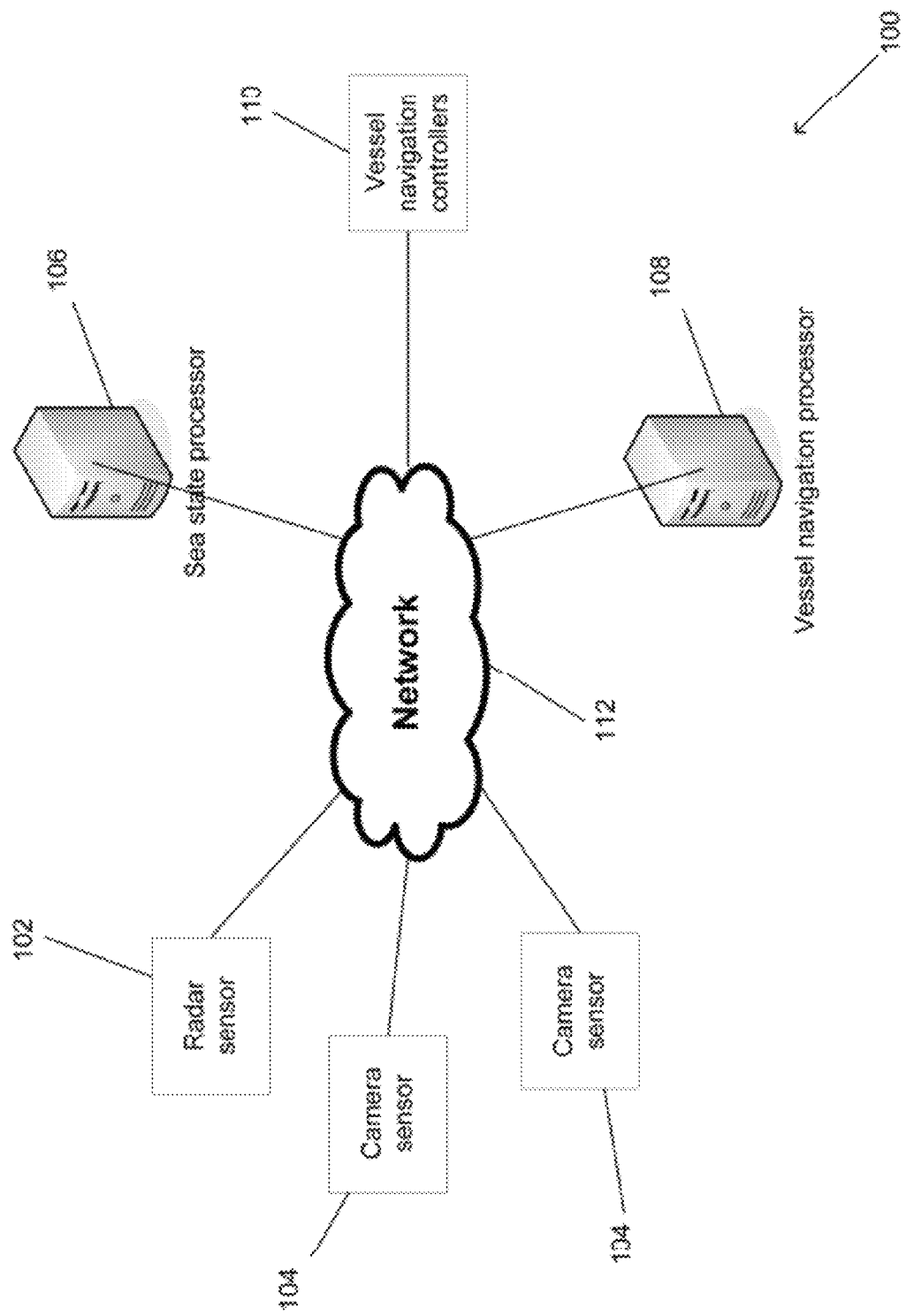
FIG. 1 illustrates a system diagram of a sea state prediction and autonomous vessel navigation system in accordance with an embodiment of the invention.

Turning now to the drawings, systems and methods for automated vessel navigation using predictions of sea state conditions are illustrated. In various embodiments, sensors capture 3D maps of the sea surface. From the 3D maps, a model for the sea state is found from which sea state predictions are made. Sea state predictions can be made by detecting the peaks and troughs of waves from a noisy signal. Using the sea state predictions, a vessel can be autonomously navigated to minimize the forces experienced by the vessel and its crew associated with severe sea conditions. In this way, autonomous navigation systems in accordance with embodiments of the invention can improve the speed with which a vessel can reach a target in severe sea conditions, while reducing the likelihood of damage to the vessel and/or crew. In many embodiments, the autonomous navigation system utilizes a number of subtargets calculated based upon a main wave direction (derived from a predicted sea state) and a target location. The vessel speed, heading and load balancing state can be adjusted to reach the subtargets during the autonomous navigation. Thereby, utilizing only machine sensory input, a vessel can autonomously navigate severe sea conditions in a way that limits the forces and/or damage experienced by the craft and crew.

In many embodiments, autonomous sea surface navigation utilizes 3D maps where features of the sea state are extracted. Sea state features include any potential hazards such as debris on the water or strong currents or waves on the sea surface. A sequence of 3D images of the sea surface can be analyzed to predict future sea states. Sea states can be determined by modeling the observed undulations in the sea surface as being caused by one or more propagating planar waves. In several embodiments, the sea state prediction involves locating peaks and troughs in a sequence of 3D images in order to the propagation of wavefronts. The wavefronts can then be used to estimate the amplitude, frequency and velocity of each observed propagating wave. In a number of embodiments, peaks and troughs of waves can be found through statistical methods that determine high and low points within a 3D map that can then be grouped to identify wavefronts. Once the amplitude, frequency and velocity of the waves are determined, predictions can be made concerning the sea state at a time in the future. In many embodiments, the sea state prediction is utilized to derive safe paths to a target that limit the forces experienced by the craft or crew.

In several embodiments, autonomous navigation systems determine paths to a target utilizing navigation techniques including tacking by determining the vessel's point of sail relative to wave direction (as opposed to wind direction). Tacking is a maneuver employed in sailing by which a vessel turns its bow through the wind so that the direction from which the wind blows changes from one side to the other. Similarly, for wave direction, tacking is a maneuver by which a vessel turns its bow through the wave so that the direction of the forward force of the wave changes from one side of the vessel to the other. Points of sail typically describe a sailing boat's course in relation to the wind direction, such as by utilizing tacking to sail into the wind. Using the points of sail analogy with respect to wave direction, the term point of sail is used here to describe the direction in which a vessel navigates relative to wave direction. In particular embodiments, an autonomous navigation system constantly updates the heading of the vessel in response to the dynamic nature of the sea surface.

Systems and methods for performing sea state prediction and automated vessel navigation using sea state predictions in accordance with embodiments of the invention are discussed further below.

System Architecture

Autonomous navigation systems in accordance with many embodiments of the invention include a system where sensors, processors and controllers function to predict a sea state and to provide navigation instructions to a vessel. FIG. 1 illustrates a system diagram of a sea state prediction and autonomous vessel navigation system 100 in accordance with an embodiment of the invention. The system 100 includes a radar sensor 102 and camera sensors 104. These sensors are connected to a sea state processor 106, vessel navigation processor 108 and vessel navigation controller(s) 110 via a network 112.

In the illustrated embodiment, the camera sensors (104) are configured as a stereo pair and can be utilized in combination with the radar sensor (102) to create a sequence of 3D images of the sea state. These 3D images of the sea state can be processed by a sea state processor to predict future sea states. In certain embodiments, the sea state processor can model the sea state for future predictions by detecting multiple wavefronts over time to estimate the amplitude, frequency and velocity of the wavefronts. In various embodiments, wavefronts are determined by detecting the peaks and troughs in a noisy signal through methods including (but not limited to) high and low point clusters on the 3D images of the sea state. The detection of wavefronts in accordance with embodiments of the invention is discussed below.

In the illustrated embodiment, the sea state prediction and autonomous vessel navigation system 100 navigates the vessel based upon the sea state predictions. In certain embodiments, information related to a main wave direction or wave phase is used to determine a tack plan or subtarget location as part of a navigation plan to reach a predetermined target. Vessel speed, heading and load balancing in view of the target can then be updated by the sea state prediction and autonomous vessel navigation system 100.

In many embodiments, the system is implemented locally on a vessel or can utilize remote computing resources. The sensors can be any kind of sensor capable of producing 3D images of a sea surface. In addition, the sea state processor and vessel navigation processor can be implemented using the same physical computing system or on different processors. Vessel navigation controllers can be any controller that is used to control vessel navigation. In many embodiments, the sea state prediction and autonomous vessel navigation system is implemented using a Control. Architecture for Robotic Agent Command and Sensing (CARACaS) manufactured by Spatial. Integrated Systems, Inc. of Virginia Beach, Va.

Processes related to a sea state prediction and autonomous vessel navigation in accordance with embodiments of the invention are discussed further below.

Sea State Prediction and Autonomous Navigation

Figure 2:
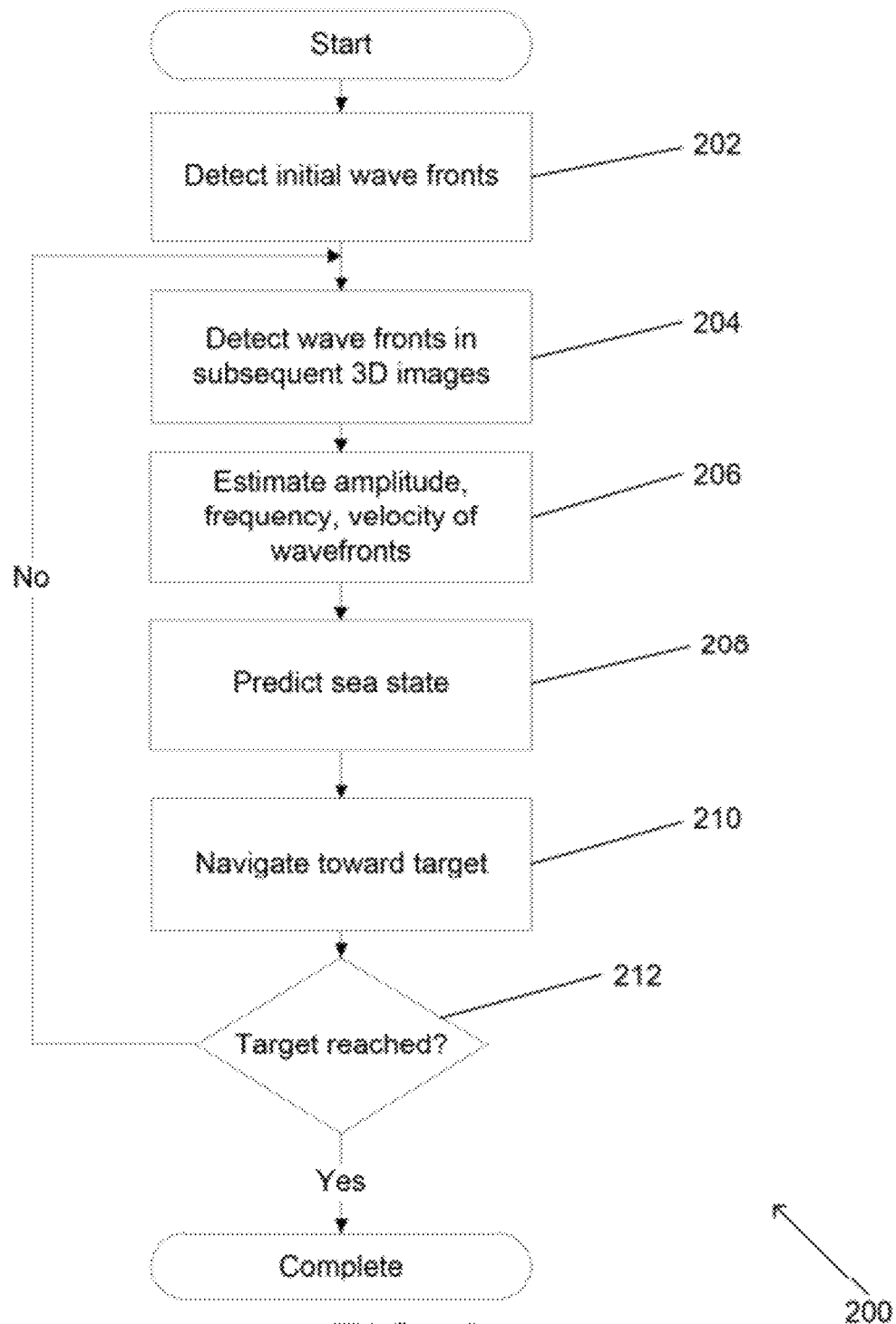
FIG. 2 is a flow chart illustrating a process for autonomous vessel navigation involving the detection of wave fronts in accordance with an embodiment of the invention.

As the sea surface changes, sea state predictions can be utilized to facilitate autonomous navigation to targets. FIG. 2 is a flow chart illustrating a process 200 for performing sea state prediction for use in autonomous vessel navigation in accordance with an embodiment of the invention. The process 200 begins by detecting (202) wave fronts in an initial 3D image. After detecting (202) initial wave fronts, the movement of the wave fronts can be tracked by detecting (204) wave fronts in subsequent 3D images. Based upon the location of wave fronts in the sequence of 3D images, the amplitude, frequency and velocity of the wavefronts can be estimated (206). After the characteristics of the observed waves are estimated (206), sea state predictions (208) can be made by modeling the propagation of the observed waves at a point of time in the future. Based upon the sea state prediction (208), the system can plan (210) a course toward a target destination. After the system begins to navigate (210) along the course to the target destination, a decision (212) is made as to whether the target has been reached. If the target is not yet reached, the system continues to collect information used to refine sea state predictions and to navigate to the target based upon the sea state predictions. If the target is already reached, then the process ends.

In many embodiments, initial wave fronts are detected by determining peaks and troughs in a noisy signal thorough statistical analysis of high and low point clusters. The initial wave fronts can be observed by analyzing a single 3D map of a sea state or multiple 3D maps of a sea state captured from different perspectives and then fused or processed in a similar manner that exploits the redundancy in the images. Similar analysis can be utilized to detect wavefronts in subsequent 3D map(s) of the sea surface.

In several embodiments, sea state predictions can be made based upon the expected behavior of multiple wave fronts modeled as planar waves. Tracking the waves from one image or 3D map of the sea surface to the next can enable the determination of the amplitude, frequency and velocity of the waves. Once these parameters are known for each wave, future sea states can be predicted.

In a multitude of embodiments, navigation toward a target can be accomplished by navigating toward a subtarget dependent upon the sea state and the target location. The subtarget allows for vessel navigation to adapt to changing sea states. Autonomous navigation systems that utilize information obtained from sea state predictions in accordance with embodiments of the invention are discussed further below. Prior to discussing autonomous navigation systems, however, processes related to wave front detection in accordance with embodiments of the invention are discussed.

Wave Front Detection

Figure 3:
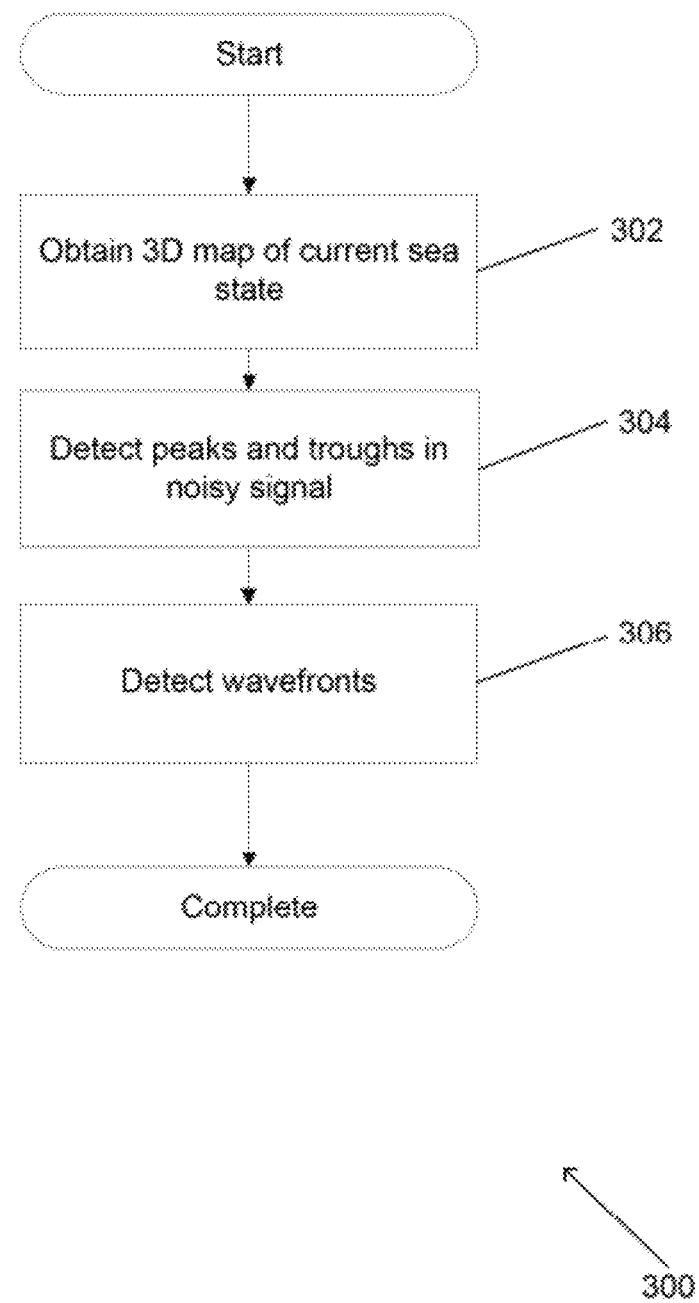
FIG. 3 is a flow chart illustrating a process for detecting wave fronts from a 3D map of a current sea state in accordance with an embodiment of the invention.

Wave fronts can be detected by processing information from a 3D map of the sea surface. FIG. 3 is a flow chart illustrating a process 300 for detecting wave fronts from a 3D map of the sea surface in accordance with an embodiment of the invention. The process 300 begins by obtaining (302) a 3D map of the sea surface. After obtaining (302) the 3D map, peaks and troughs on the 3D map are detected (304) within the noisy signal. After detecting (304) the peaks and troughs, the wavefronts are then detected (306).

A machine vision system can generate a sequence of images that can be used to generate a 3D map of how sea state changes over time. The system can use one or more stereo camera systems and the sensor data from the stereo camera systems can be combined with additional information from other types of sensors including but not limited to radar systems. Certain systems use two pairs of cameras to obtain stereo 3D images that are then fused. Several systems use black and white cameras, although color cameras or a combination of color and black and white can be used in other systems. In many embodiments, radar information is fused with information captured by stereo camera systems to obtain better low light performance and to increase the range of the 3D map. In other embodiments, any of a variety of sensor systems that can generate 3D images can be utilized including but not limited to array cameras.

In a variety of embodiments, peaks and troughs can be detected in a noisy signal through signal processing. A sea state detection system can take a sequence of 3D images of the sea surface over a short period of time. A sequence of high and low point clusters can be detected across the 3D images using a number of different processes including but not limited to the RANdom SAmple Consensus or RANSAC process, a least means square process, and/or thresholding.

3D images of a sea surface generate a significant amount of noise as the water is dynamic and reflections in the water can be difficult for systems to handle. A number of methods can also be used to filler noise from the captured 3D images. The RANSAC process is an iterative method to estimate parameters of a model from a set of observed data, which contains outliers, or data that does not fit a model. RANSAC can be used to filler out noise through an assumption that given a set of inliers, there is a procedure which can estimate the parameters of a model that optimally explains or fits the data. The least means square ELMS) process finds the coefficients for a specific function that produces the least mean square of the error signal, or the difference between the desired and the actual signal. Thresholding is a process whereby peaks and troughs are identified based upon a value being above or below a specified threshold. Although specific processes for detecting peaks and troughs are disclosed above, any of a variety of processes can be utilized in accordance with embodiments of the invention.

In numerous embodiments, wavefronts can be detected by analyzing the peaks and troughs. Once the peaks and troughs are detected, then they can be grouped together to locate the wave fronts of planar waves on the water. The nearest neighbor algorithm can be used to identify wave fronts from clusters of peaks or clusters of troughs. The nearest neighbor algorithm classifies an object by a majority of its neighbors, with the object being assigned to the class most common amongst its nearest neighbors. In other embodiments, any of a variety of algorithms can be utilized to group peaks and troughs to identify wavefronts.

Although specific processes are described above for detecting wavefronts within 3D images of a sea surface. Any of a variety of processes that are capable of detecting planar waves in sequences of captured 3D images can be utilized in accordance with embodiments of the invention. Once wavefronts have been detected, a sea state prediction can be performed and a vessel can autonomously navigate relying upon the sea state prediction. Processes related to autonomous vessel navigation in accordance with embodiments of the invention are discussed further below.

Autonomous Vessel Navigation

Figure 4:
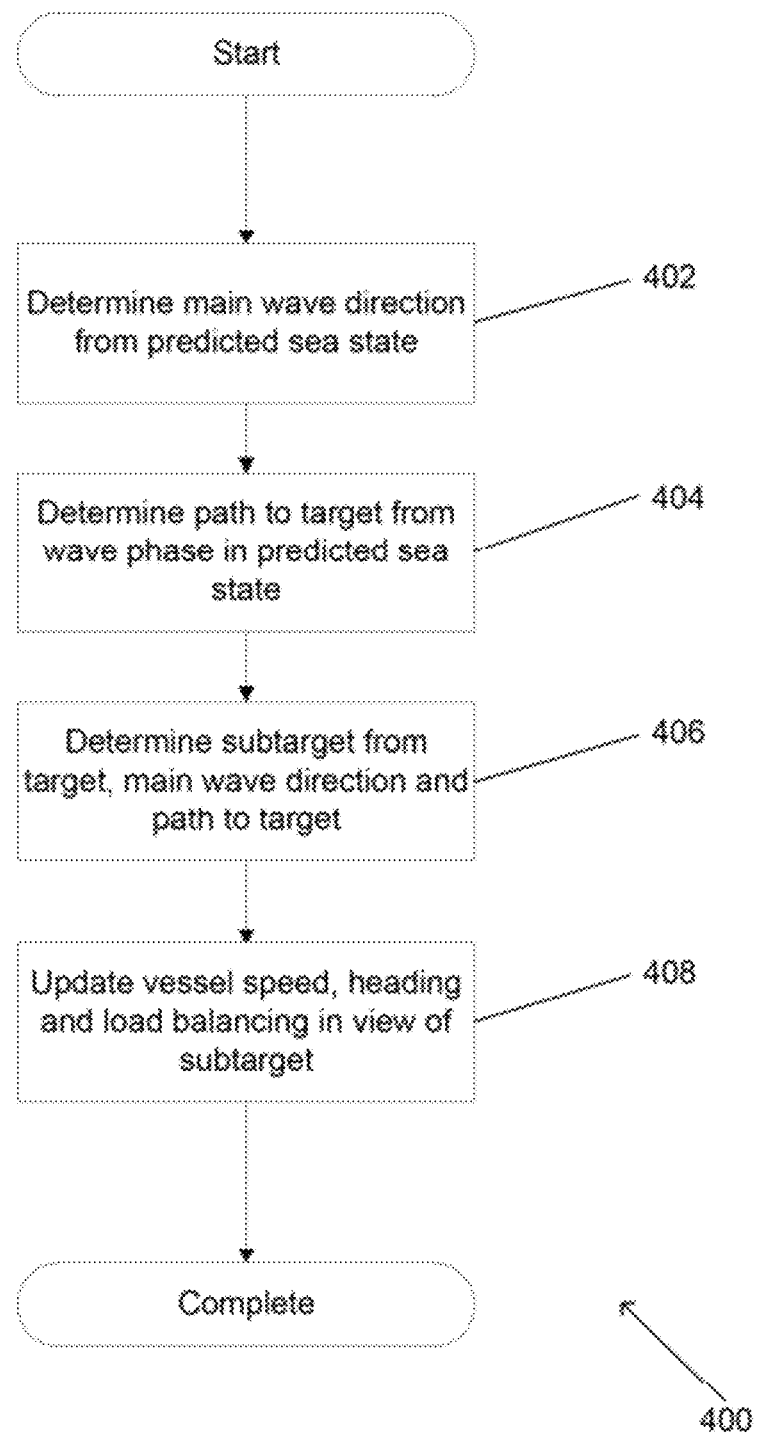
FIG. 4 is a flow chart illustrating a process for autonomous vessel navigation using a target, main wave direction and wave phase prediction in accordance with an embodiment of the invention.

Autonomous vessel navigation systems can utilize sea state predictions to improve system performance in any of a number of ways including (but not limited to) attempting to limit the forces experienced by a vessel and/or its crew in severe sea states. In many embodiments, the sea state may be sufficiently severe as to warrant navigating to avoid waves as opposed directly toward a target. FIG. 4 is a flow chart illustrating a process 400 for autonomous vessel navigation using a target, and main wave direction in accordance with an embodiment of the invention. The process 400 begins by determining (402) the main wave direction from the predicted sea state. After determining (402) the main wave direction, a path to the target is developed (404). In several embodiments, planning the path to the target can utilize the predicted phase of the main wave obtained using a sea state prediction to time turns relative to the phase of the wave. After determining (404) a path to the target, a subtarget is determined (406) and the vessel speed, heading and load balancing are updated (408) to steer the vessel toward the subtarget. Autonomous vessel navigation systems in accordance with embodiments of the invention are discussed further below.

Autonomous Navigation Control Framework

Figure 5:
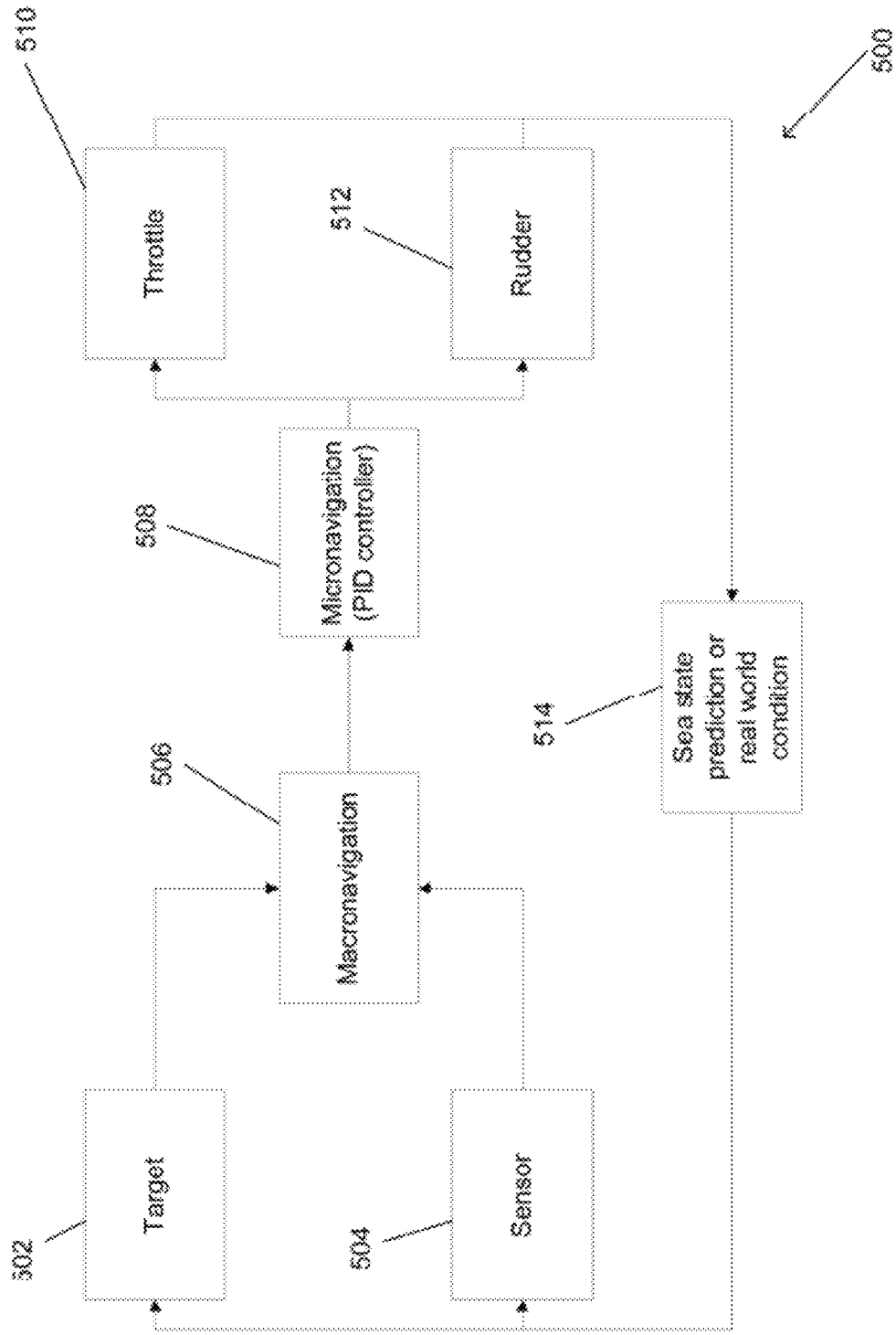
FIG. 5 illustrates a control framework for an autonomous vessel navigation system utilizing a macronavigation system and a micronavigation system in accordance with an embodiment of the invention.

Autonomous vessel navigation can be facilitated using a control framework. FIG. 5 illustrates a control framework 500 for autonomous vessel navigation utilizing a macronavigation system and a micronavigation system from target and sensory information in accordance with an embodiment of the invention. In the control framework, both the target 502 and sensor 504 feeds into the macronavigation system 506. The macronavigation system 506 feeds into the micronavigation system 508, which can be a proportional-integral-derivative controller (PID controller). In the illustrated embodiment, the micronavigation system 508 feeds into both the throttle 510 and the rudder 512 of the vessel. The status of the throttle 510 and rudder 512 of the vessel effects a sea state prediction or real world conditions 514. The sea state prediction or the real world conditions 514 then affects the target 502 and the sensor 504.

In many embodiments, macronavigation processes determine the way autonomous navigation occurs while micronavigation processes determine how the autonomous navigation strategy should be implemented. Both the target and the sensory data are used by the macronavigation system to plot the best navigable path to the target given the observed sea state (obtained using the sensor system). In certain embodiments, the macronavigation system masks the target position and calculates subtargets that are provided to the micronavigation system so that the vessel does not head directly toward the actual target. In this way, the macronavigation system can implement tacks and/or other maneuvers that can limit the forces experienced by the vessel and its crew. The micronavigation controls the throttle and rudder of the vessel to head the vessel toward the target or subtarget provided to the micronavigation system by the macronavigation system. After the throttle and rudder states are updated, new sea state predictions can be used by the autonomous navigation system to update the path the vessel takes to the target.

In certain embodiments, for reliable target reaching, a PID control approach is used by the micronavigation system. A PID controller is a generic control loop feedback mechanism that calculates an "error" value as the difference between a measured process variable and a desired set point. The controller attempts to minimize the error by adjusting the process control input. In many embodiments, the PID controller drives the throttle strength and position based on the current target (or subtarget) position provided to the micronavigation system relative to the vessel. The throttle strength is proportional to the absolute target distance, and the rudder command is proportional to the target direction. In calculations for particular embodiments, $t(t)=(x,y)$ is the target position and $p(t)$ is the current vessel position in world coordinates at time t. Then, the control deviation is $c(t)=t(t)-p(t)$. The control deviation is translated into command signals according to the following equation for the throttle strength:

$$t(t)=P_t\|e(t)\|+I_t\|\int_0^t e(t')dt'\|+D_t\|e(t)-e(t-1)\|$$

The control deviation is translated into command signals according to the following equation for the rudder position, where $e_y$ is the control deviation that points sideways to starboard along the y-axis of the vessel according to the coordinate system as seen by the vessel:

$$r(t)=P_r e_y(t)+I_r\int_0^T e_y(t')dt'+D_r|e_y(t)-e_y(t-1)|$$

Targets behind the vessel require a turn of the vessel. This can easily be achieved by multiplying throttle and rudder commands with $sgn(e_x(t))$ and with $sgn(c_x(t))$, respectively. In a number of embodiments, the following gain constants can be used: $P_t=0.03$; $I_t=D_t=P_r=0.02$, $I_r=0$ and $D_r=0.01$. The throttle and rudder commands can be restricted to a reasonable range by clipping their values to [−0.25, 0.7] and [−0.4, 0.4]. In other embodiments, any of a variety of micronavigation systems can be utilized including PID control systems that incorporate alternative parameters and/or constraints.

Figure 6:
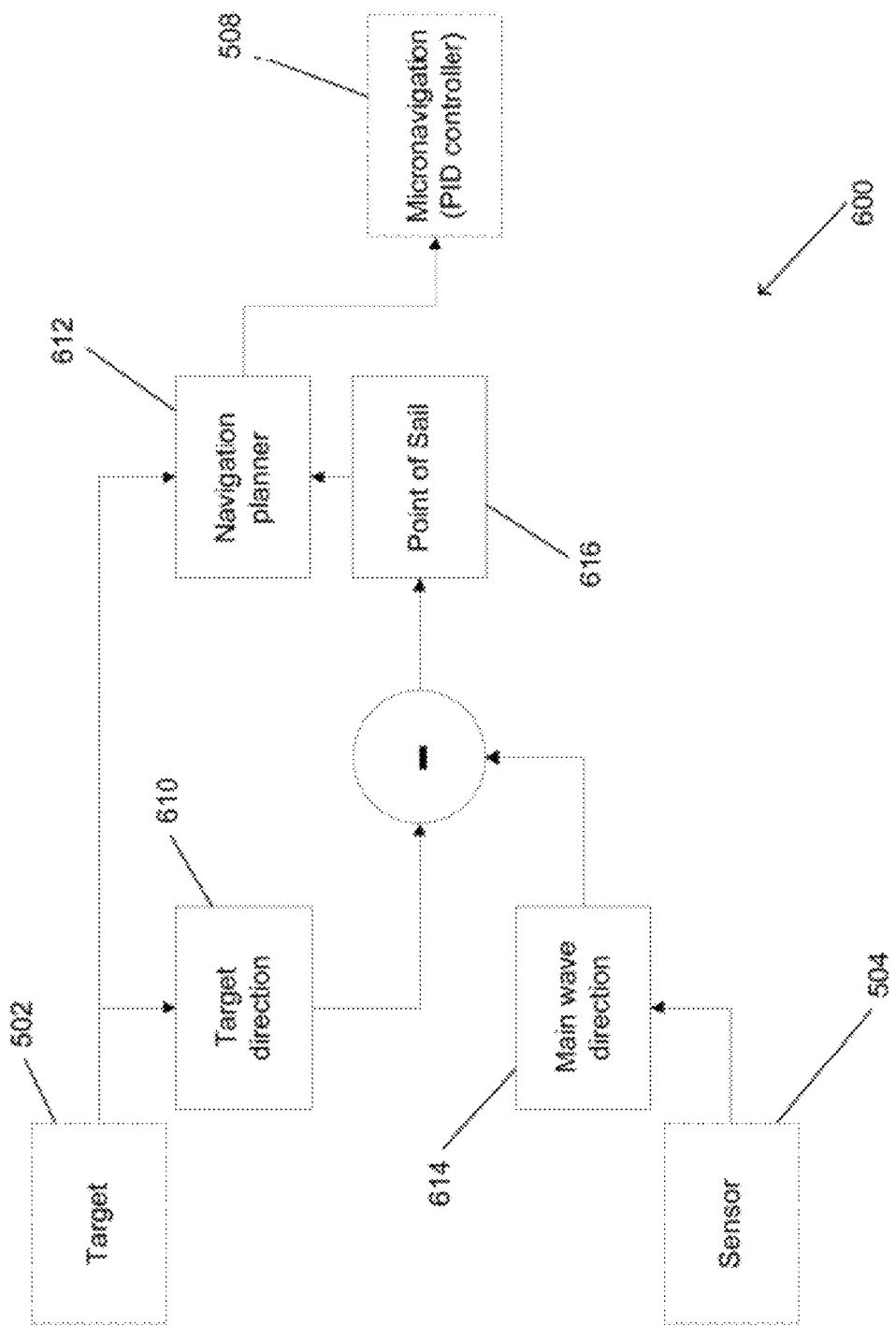
FIG. 6 illustrates a control framework for a macronavigation system in accordance with an embodiment of the invention.

As discussed above, the subtargets utilized by micronavigation systems are generated by macronavigation systems in accordance with embodiments of the invention. FIG. 6 illustrates a control framework 600 for macronavigation in accordance with an embodiment of the invention. In the control framework 600, a target 502 is used to determine (610) the direction from the vessel to the target. The target is also provided to a navigation planner 612. Sensor data 504 is used to determine (614) a main wave direction. In many embodiments, the main wave direction can be determined using a sea state prediction process similar to any of the sea state prediction processes outlined above. The difference between the target direction 610 and the main wave direction 614 determines (616) the point of sail of the vessel relative to the main wave. The point of sail is fed into the navigation planner 612, which generates a subtarget that is provided to the micronavigation system 508. As is discussed further below, the macronavigation system illustrated in FIG. 6 can be utilized to incorporate tack planning into a macronavigation process in accordance with embodiments of the invention.

Tack Planning

In several embodiments, tacking behavior constrains vessel motion to minimize the effects of severe sea conditions, such as bow diving. Bow diving is when a vessel's bow is submerged due to either the motion of the boat or the sea surface. In many embodiments, tack planning is used to determine subtargets in autonomous vessel navigation to limit the forces that are experienced by the vessel and/or crew as it navigates toward a target.

Referring back to the macronaviagtion system illustrated in FIG. 6, knowledge about the point of sail (POS) necessary to reach a target is an important part of implementing a tack planner. In certain embodiments, the POS is calculated depending on the target direction (TD) and the main wave direction (MWD) by POS=TD−MWD. Thus, a prerequisite for the planner is the estimation of the MWD. While derivation of the target direction from the target position is straightforward, the main wave direction is extracted from sensory information.

Figure 7:
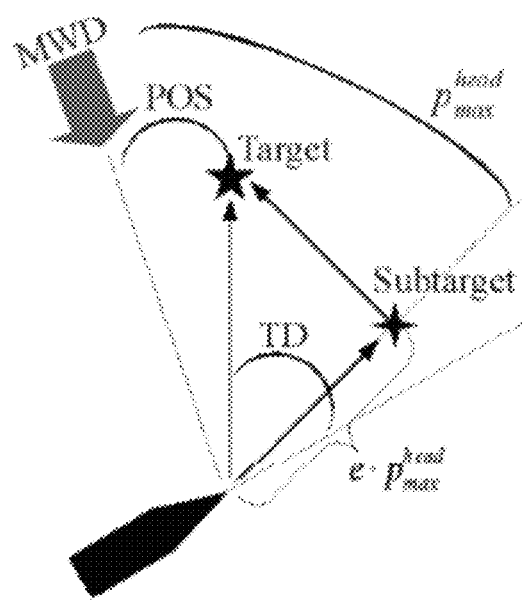
FIG. 7 illustrates a determination of a subtarget from an appropriate point of sail given a target position and main wave direction in accordance with an embodiment of the invention.

Macronavigation systems in accordance with many embodiments of the invention tack at certain angles to minimize bow diving. FIG. 7 illustrates a determination of a subtarget from an appropriate point of sail given a target position and main wave direction in accordance with an embodiment of the invention. In the illustrated embodiment, when the point of sail necessary to reach the target is too steep with respect to the main wave direction, the planner determines that a subtarget that is the projection of the original target onto the appropriate point of sail.

Figure 8A:
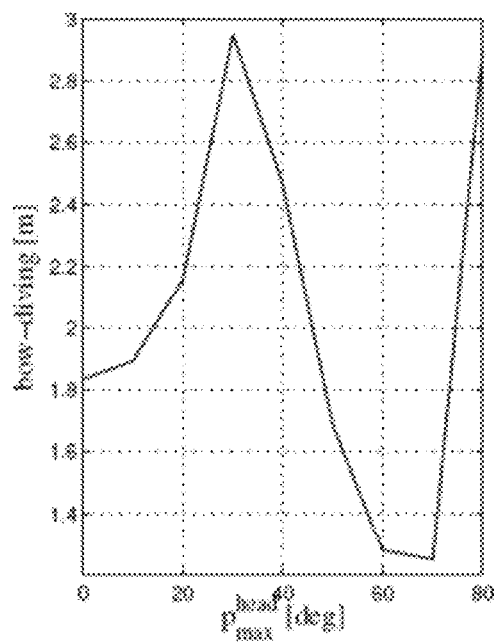
FIG. 8A illustrates experimental results for bow-diving as a function of the maximal point of sail for head seas in accordance with an embodiment of the invention.
Figure 8B:
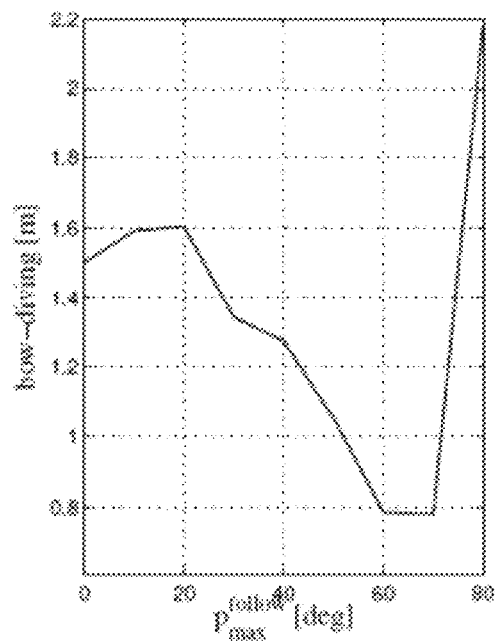
FIG. 8B illustrates experimental results for bow diving as a function of the maximal point of sail for following seas in accordance with an embodiment of the invention.

FIG. 8A illustrates experimental results for bow diving as a function of the maximal point of sail for head seas in accordance with an embodiment of the invention. Likewise, FIG. 8B illustrates experimental results for bow diving as a function of the maximal point of sail for following seas in accordance with an embodiment of the invention. As illustrated in both FIGS. 8A and 8B, bow diving is significantly reduced around a tack of 60 degrees in both head and following seas. Thereby in certain embodiments, tack planning can take advantage of tacking at around 60 degrees.

Generally, points of sail in parallel or antiparallel to the MWD result in considerable bow diving. The navigation planner creates subtargets for tacks according to a safe point of sail $p_{opt}$, when the point of sail p necessary to reach a target falls into one of the following ranges:

$$p_{opt} = \begin{cases} -p_{max}^{head} & \text{if } -p_{max}^{head} \le p \le 0 \\ p_{max}^{head} & \text{if } 0 \le p \le p_{max}^{head} \\ 180 - p_{max}^{follow} & \text{if } 180 - p_{max}^{follow} \le p \le 180 \\ 180 + p_{max}^{follow} & \text{if } 180 \le p \le 180 + p_{max}^{follow} \end{cases}$$

A subtarget is created that is the projection of the original target onto the adopted point of sail $p_{opt}$. In doing so, the navigation planner transfers the direct path to the target into a tacked path that circumvents extreme points of sail with the risk of bow diving. In various embodiments, the concept of subtarget generation is illustrated in FIG. 7. Certain embodiments yield ideal values for $p_{max}^{head}$ and $p_{max}^{follow}$ where $p_{max}^{head} = p_{max}^{follow} = 60$ degrees. Therefore, certain embodiments use a 60 degree margin around head and following seas. In other embodiments, a greater or lesser margin can be used as appropriate to specific applications.

Figure 9A:
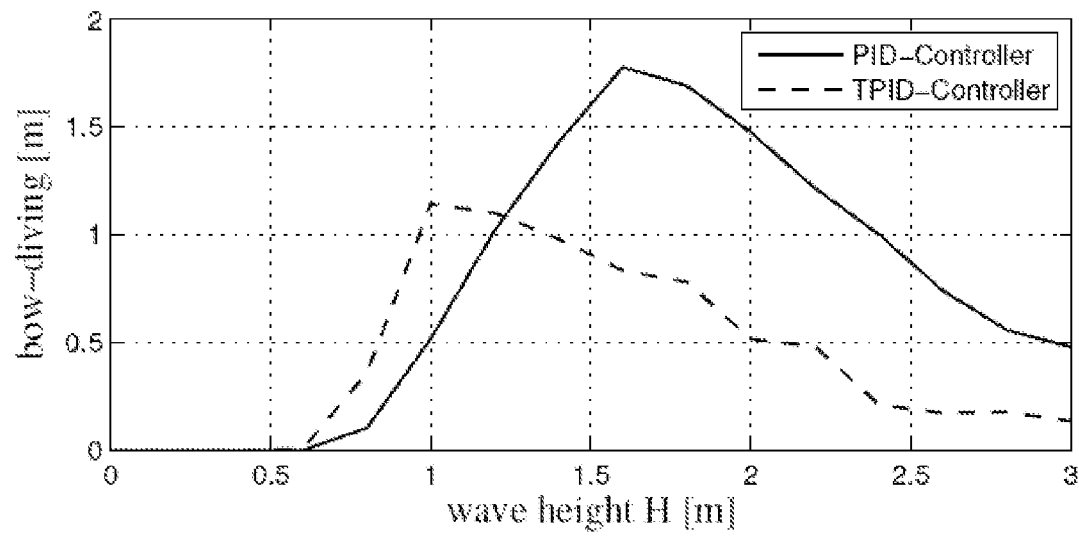
FIG. 9A illustrates experimental results for a stand-alone PID controller compared to the PID controller configured to tack using a macronavigation system in accordance with an embodiment of the invention with bow diving as a function of the wave height H.
Figure 9B:
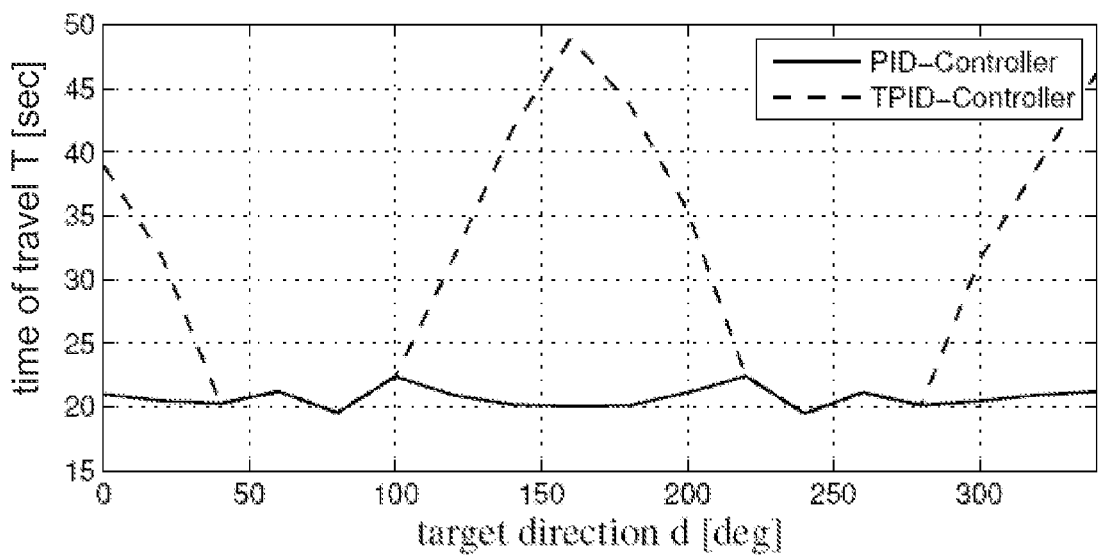
FIG. 9B illustrates experimental results for a stand-alone PID controller compared to the PID controller configured to tack using a macronavigation system in accordance with an embodiment of the invention with time of travel. T as a function of the target direction d.

FIG. 9A illustrates experimental results for a stand-alone PID controller compared to a TPID-Controller that is controlled by a macronavigation system that implements tacking the manner outlined above with bow diving as a function of the wave height H in accordance with an embodiment of the invention. FIG. 9B illustrates experimental results for a stand-alone PID controller compared to a TPID-Controller that is controlled by a macronavigation system that implements tacking the manner outlined above with time of travel T as a function of the target direction d in accordance with an embodiment of the invention. Experimental results for FIGS. 9A and 9B were generalized for wave heights H from 0 meters to 3 meters.

FIG. 9A illustrates how the addition of the tack planner in certain embodiments significantly improves the performance with respect to bow diving. However, for small wave heights certain embodiments favor not utilizing tacking as embodiments that tack dive more often with the bow than a stand-alone microcontroller. This is due to the increased travel distance, which consequently results in an increased number of wave crests to pass. The extra time of travel caused by the increased travel distance due to the tacks is revealed in FIG. 9B. But the increased time of travel is rather moderate and worth investing for the security gained by the tack planner. In numerous embodiments, tacking and the appropriate tack angles $p_{opt}^{head}$ and $p_{opt}^{follow}$ are selected depending on the current sea state. In particular embodiments in the case of a calm sea state, tacking is not necessary and $p_{opt}^{head}$ as well as $p_{opt}^{follow}$ can be set to zero. However, bow diving is significantly reduced for severe sea conditions. Moreover, FIG. 9B indicates how bow diving depends on the relation of the vessel's length and the wave length. Thereby in certain embodiments only for a specific region around a wave height of 1.6 m, the vessel dives considerably with the bow into the water. For these wave heights, shallow water can yield wave lengths similar to the vessel's length.

Figure 10:
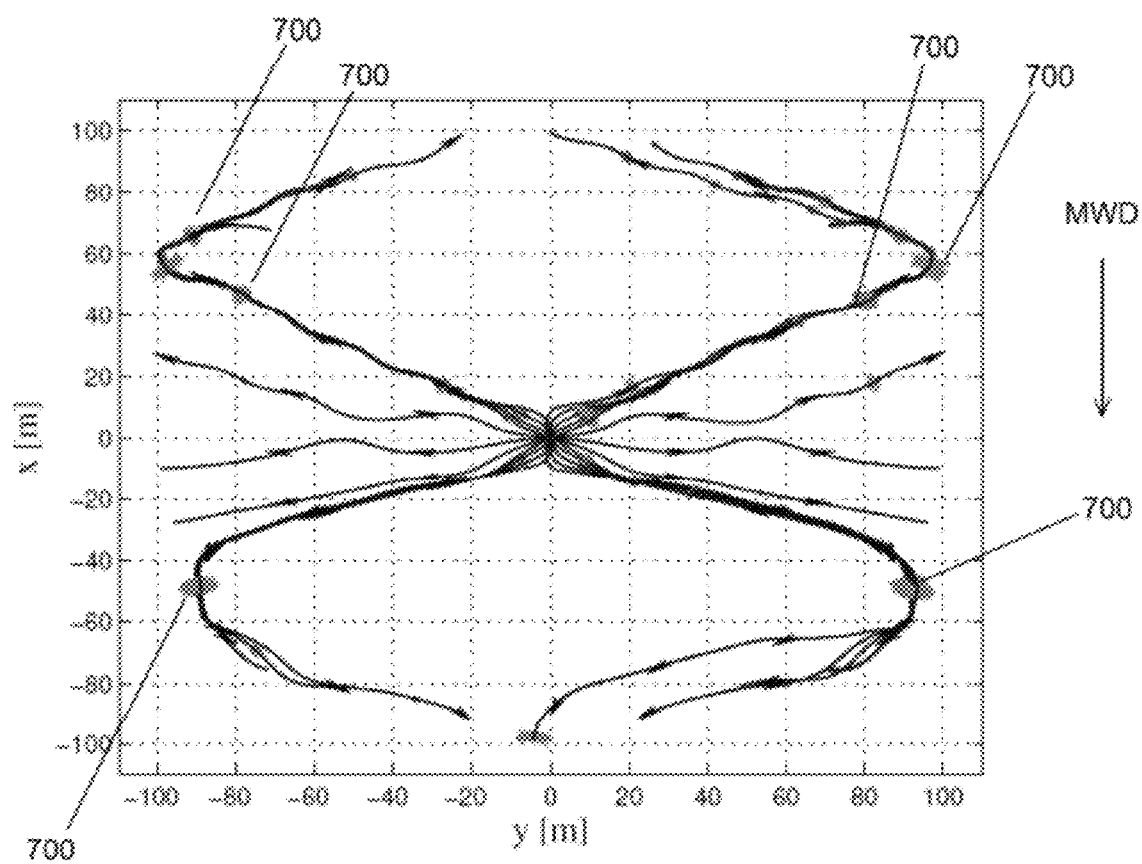
FIG. 10 illustrates the trajectories generated by an autonomous navigation system that utilizes tacking to navigate to a target 100 meters away in 18 different directions in accordance with an embodiment of the invention.

FIG. 10 illustrates the trajectories generated by an autonomous navigation system that utilizes tacking in the manner outlined above to navigate to a target 100 meters away in 18 different directions in accordance with an embodiment of the invention. Grey areas (700) indicate the occurrence of bow diving. In the illustrated embodiment, trajectories generated by the autonomous navigation system generate tacks that avoid heading and following seas. The PID controller succeeds also in the planning condition to steer the vessel to the desired targets. In certain embodiments, bow diving does not occur as frequently as for the stand-alone PID controller. In a number of embodiments, tack planning generates a tack-trigger mechanism that triggers turning depending on the wave phase.

Figure 11:
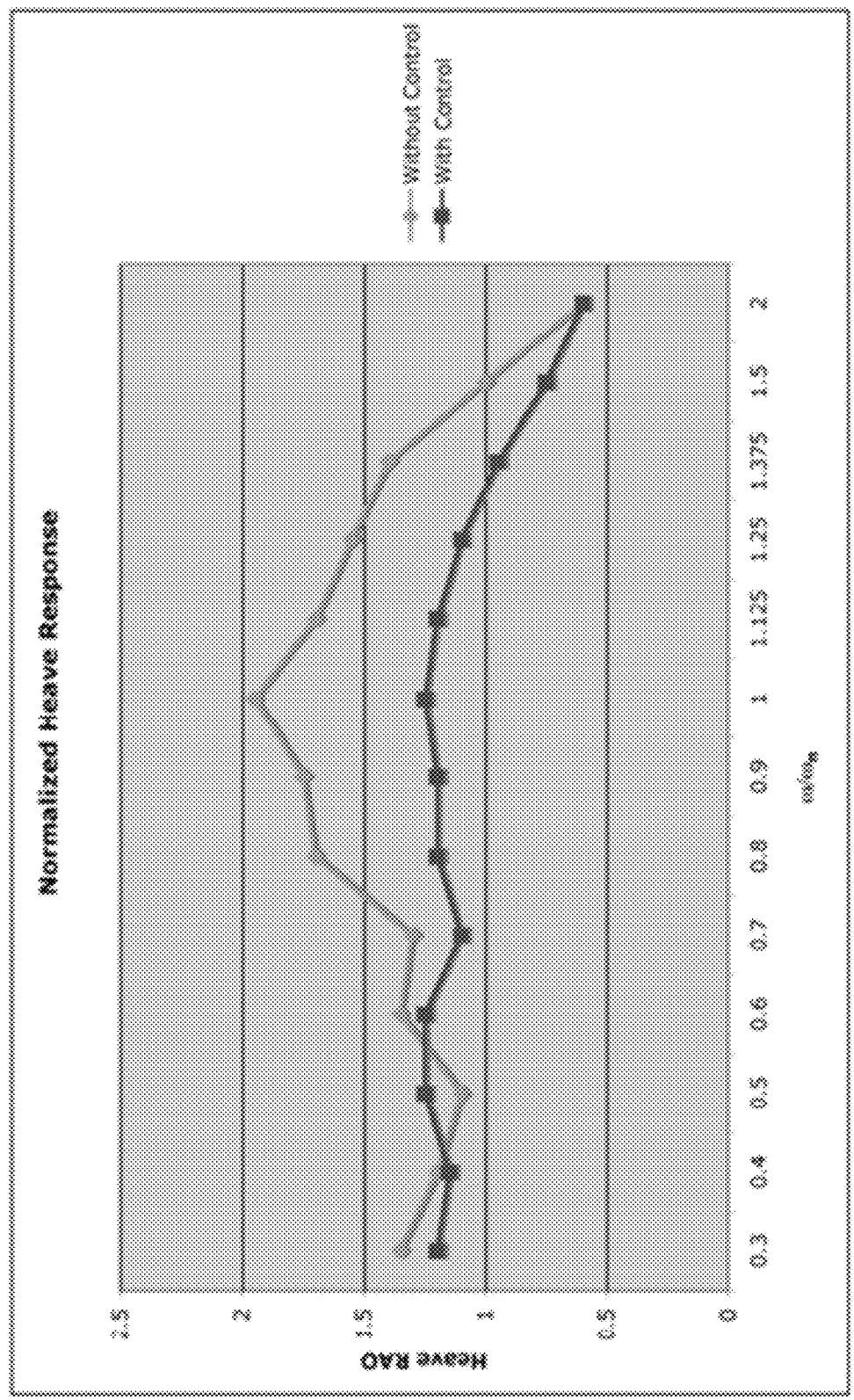
FIG. 11 illustrates the difference between normalized heave response between vessel navigation with an autonomous navigation system in accordance with an embodiment of the invention and one without the autonomous navigation system for a 13 meter high speed vessel operating at 35 knots over a range of sea states.

In numerous embodiments, autonomous navigation systems integrate adaptive planning and control that can be simulated, for example with hardware in the loop (HWIL) developed by the Jet Propulsion Laboratory headquartered in Pasadena, Calif. HWIL simulation is a technique used in the development and testing of complex real time embedded systems utilizing mathematical representations for each dynamic system. FIG. 11 illustrates the difference between normalized heave response between vessel navigation with an autonomous navigation system in accordance with an embodiment of the invention and one without the autonomous navigation system for a 13 meter high speed vessel operating at 35 knots over a range of sea states as simulated in a HWIL. In the illustrated embodiment, heave responses are generally minimized with adaptive path planning and control relative to systems without adaptive path planning and control.

While the above description contains many specific embodiments of the invention, these should not be construed as limitations on the scope of the invention, but rather as an example of one embodiment thereof.

What is claimed is:

1. A method of autonomous vessel navigation based upon a predicted sea state and target location, comprising:
   predicting a future sea state using at least one propagating wave characterizing propagation of wavefronts from peaks and troughs detected in a sequence of at least two 3D images of a sea surface;
   determining at least one subtarget based upon a target location and the predicted sea state using a macronavigation system;
   communicating the at least one subtarget determined based upon the target location and the predicted sea state to a micronavigation system;
   controlling a vessel to navigate toward the at least one subtarget using the micronavigation system;
   receiving an updated prediction of the future sea state using the macronavigation system; and
   updating the at least one subtarget based upon the target location and the updated predicted sea state using the macronavigation system.

2. The method of claim 1, wherein the predicted sea state comprises a main wave direction.

3. The method of claim 2, further comprising determining a point of sail, wherein the point of sail is determined using the difference between the target direction and the main wave direction.

4. The method of claim 1, wherein the predicted sea state comprises a wave phase information.

5. The method of claim 1, wherein the subtarget is the target location.

6. The method of claim 1, wherein the micronavigation system comprises a proportional integral derivative controller.

7. The method of claim 1, wherein navigating toward the at least one subtarget causes the vessel to tack relative to a main wave direction.

8. The method of claim 1, wherein the subtarget causes the vessel to navigate at 60 degrees relative to a main wave direction.

9. The method of claim 1, wherein controlling the vessel comprises controlling a throttle and a rudder of the vessel.

10. The method of claim 1, wherein updating the at least one subtarget comprises generating a new subtarget.

11. The method of claim 10, wherein the at least one subtarget is determined based upon a point of sail and the predicted sea state.

12. An autonomous vessel navigation system, comprising:
a macronavigation system configured to:
receive a predicted sea state and a target as inputs and to generate a subtarget as an output, wherein the predicted sea state is predicted using at least one propagating wave characterizing propagation of wavefronts from peaks and troughs detected in a sequence of at least two 3D images of a sea surface;
determine at least one subtarget based upon the target location and the predicted sea state; and
communicate the at least one subtarget determined based upon the target location and the predicted sea state to a micronavigation system; and
wherein the micronavigation system is configured to:
generate vessel control signals that head a vessel toward the at least one subtarget;
receive an updated predicted sea state; and
update the at least one subtarget based upon the target location and the updated predicted sea state.

13. The system of claim 12, wherein the predicted sea state comprises a main wave direction.

14. The system of claim 13, wherein the macronavigation system is further configured to determine a point of sail, wherein the point of sail is determined using a difference between the target direction and the main wave direction.

15. The system of claim 12, wherein the predicted sea state comprises wave phase information.

16. The system of claim 12, wherein the subtarget is the target location.

17. The system of claim 12, wherein the micronavigation system comprises a proportional integral derivative controller.

18. The system of claim 12, wherein the macronavigation system is configured to cause the vessel to tack relative to a main wave direction.

19. The system of claim 12, wherein the macronavigation system is configured to determine at least one subtarget that causes vessel navigation at 60 degrees relative to a main wave direction.

20. The system of claim 12, wherein the micronavigation system is configured to generate vessel control signals configured to control a throttle and a rudder of a vessel.

21. The system of claim 12, wherein the macronavigation system is configured to receive the predicted sea state from a system for predicting a future sea state.

22. The system of claim 12, wherein updating the at least one subtarget comprises generating a new subtarget.

* * * * *